United States Patent

[11] 3,585,923

[72] Inventor Leo R. Waller
 1229 N. Rosedale Ave., Tulsa, Okla. 74127
[21] Appl. No. 769,018
[22] Filed Oct. 21, 1968
[45] Patented June 22, 1971

[54] AUTOMATIC FOOD FRYER
 2 Claims, 12 Drawing Figs.
[52] U.S. Cl. ..................................................... 99/356, 99/404
[51] Int. Cl. ..................................................... A47j 37/12
[50] Field of Search ........................................... 99/404, 443, 238.5, 238.6, 289, 355—6, 360—65, 373, 386—87, 405—07, 420, 423, 427; 107/56, 57, 58; 117/114, 119—21; 141/83, 129, 180, 192; 177/52—3, 59, 62—4; 198/34, 39, 84; 222/77, 415

[56] References Cited
UNITED STATES PATENTS
| 2,050,475 | 8/1936 | Sumner et al. | 99/356 |
| 2,286,644 | 6/1942 | Pringle et al. | 99/404X |
| 2,496,548 | 2/1950 | La Rosa et al. | 198/39 |
| 2,619,273 | 11/1952 | Smith et al. | 141/180 |
| 2,663,477 | 12/1953 | Bendz | 141/157 |
| 2,807,203 | 9/1957 | Buechele et al. | 99/404 |
| 2,853,937 | 9/1958 | Peck | 99/404 |
| 3,024,816 | 3/1962 | Axlid et al. | 141/83 |
| 3,074,654 | 1/1963 | Guggemos | 141/83 X |

Primary Examiner—Walter A. Scheel
Assistant Examiner—Arthur O. Henderson
Attorney—Young and Thompson ABSTRACT: An automatic food fryer is provided with a feed conveyor that fills a weighing device that controls the feed. The weighing device dumps a measured weight of food into the hot cooking oil, through which it is moved by an endless conveyor. The food discharges into a receptacle on a gated conveyor, the cycle being controlled by the feed of containers to that gated conveyor.

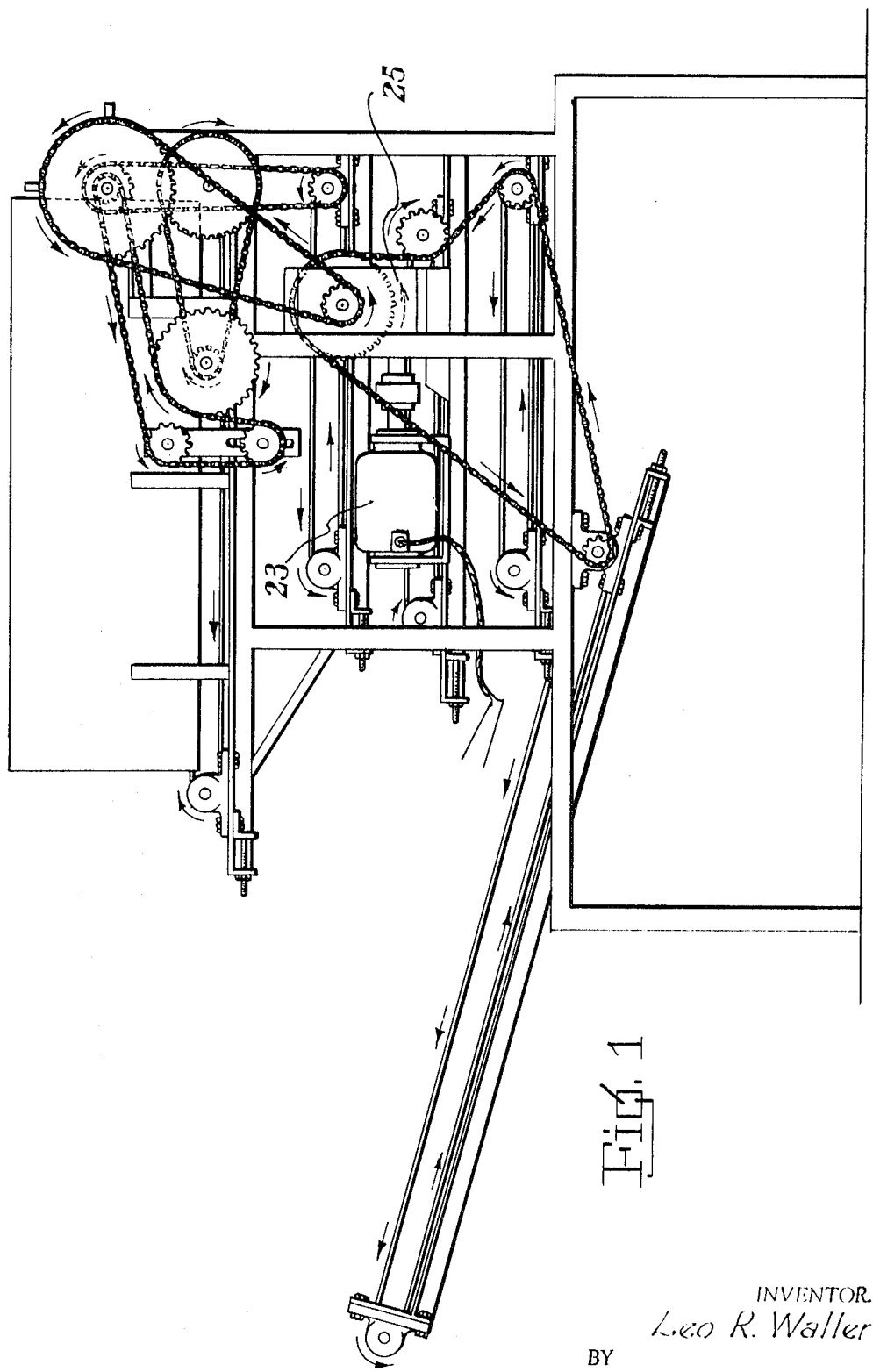

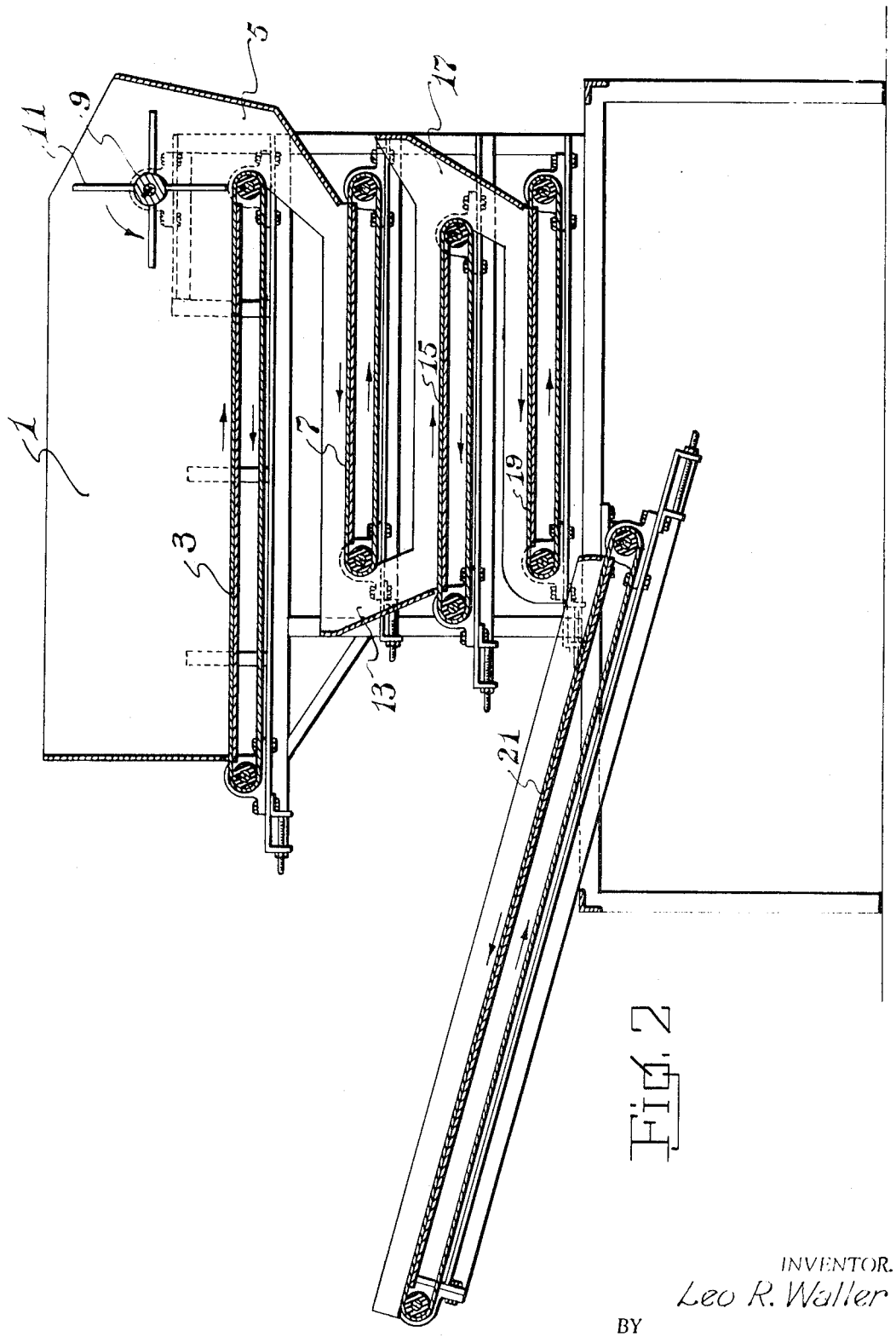

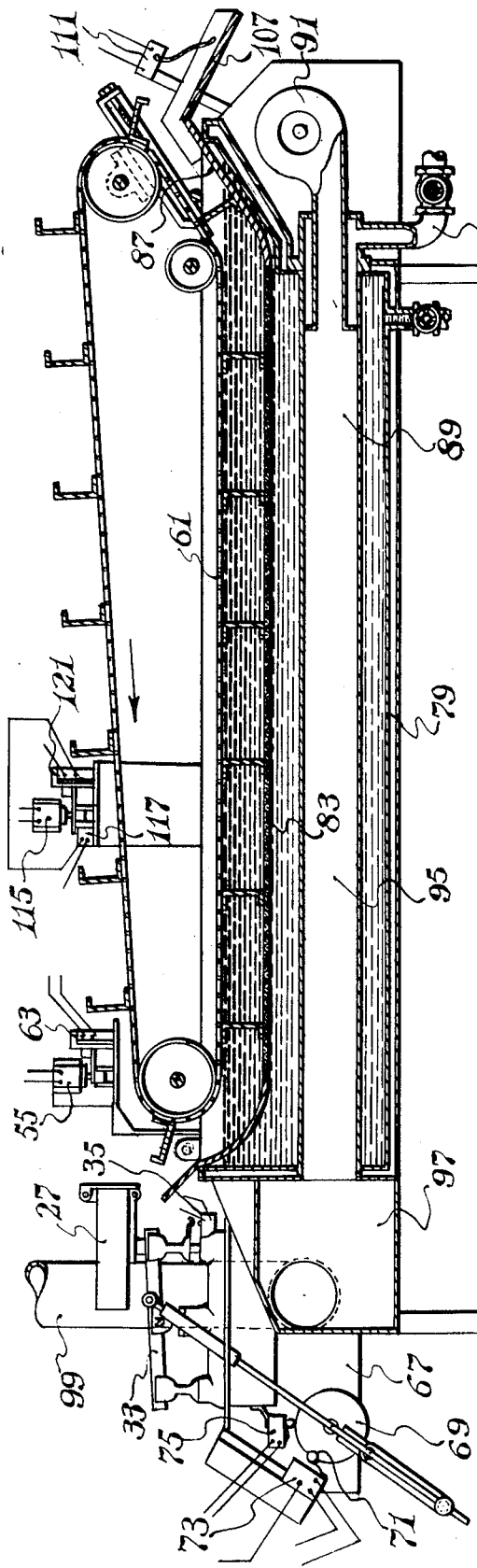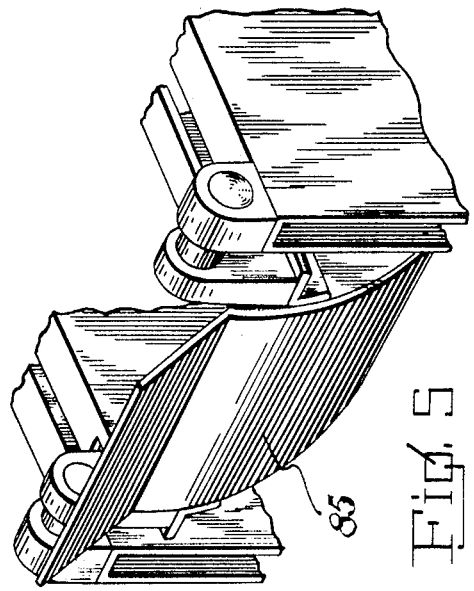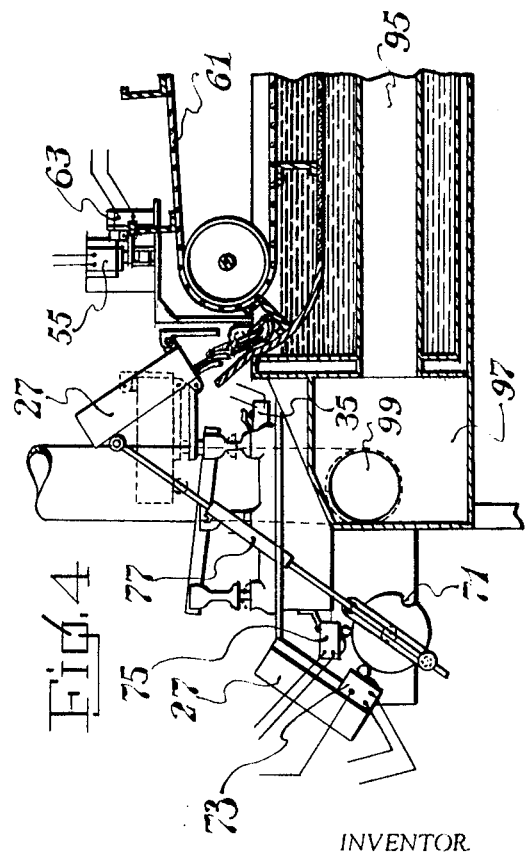

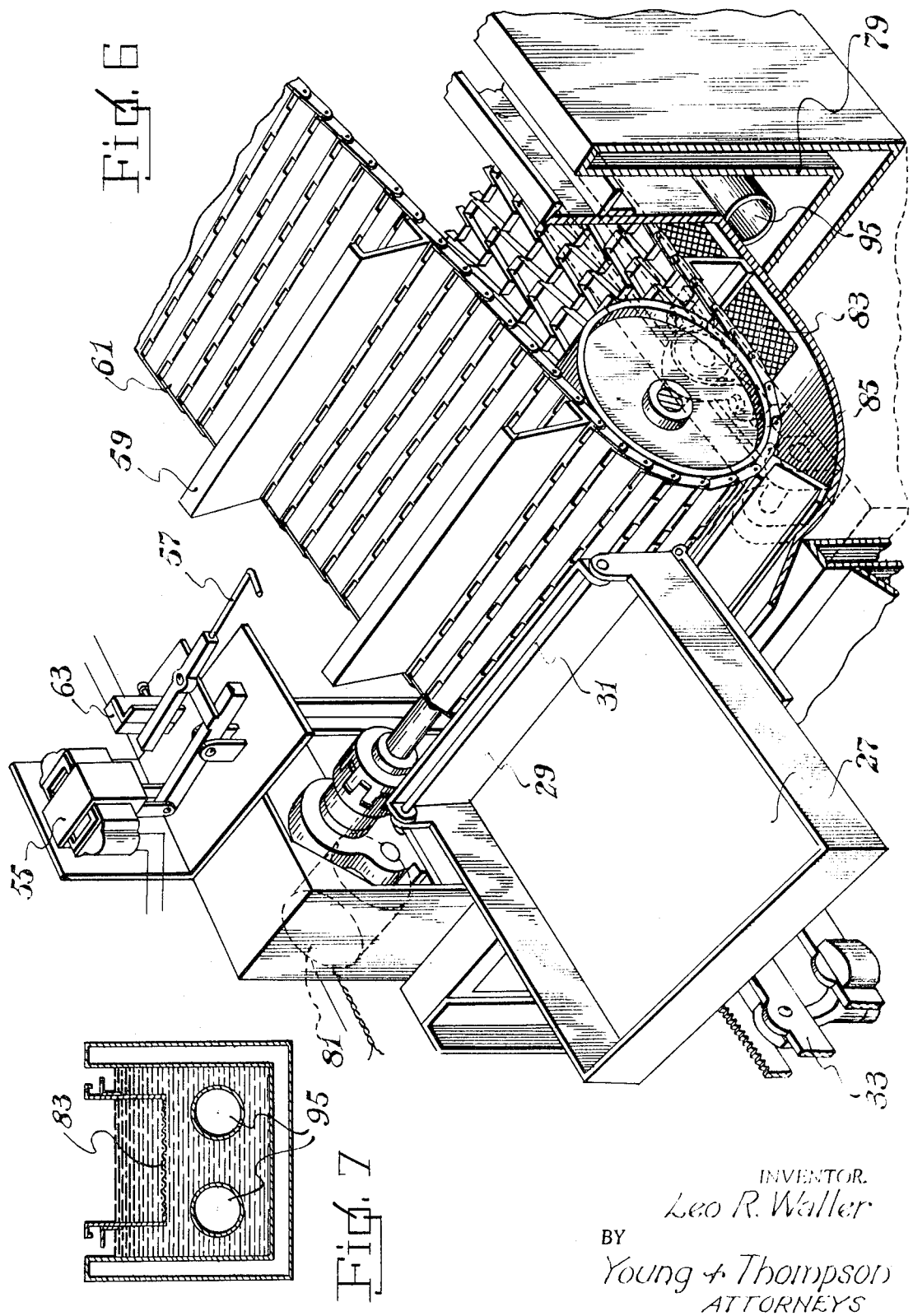

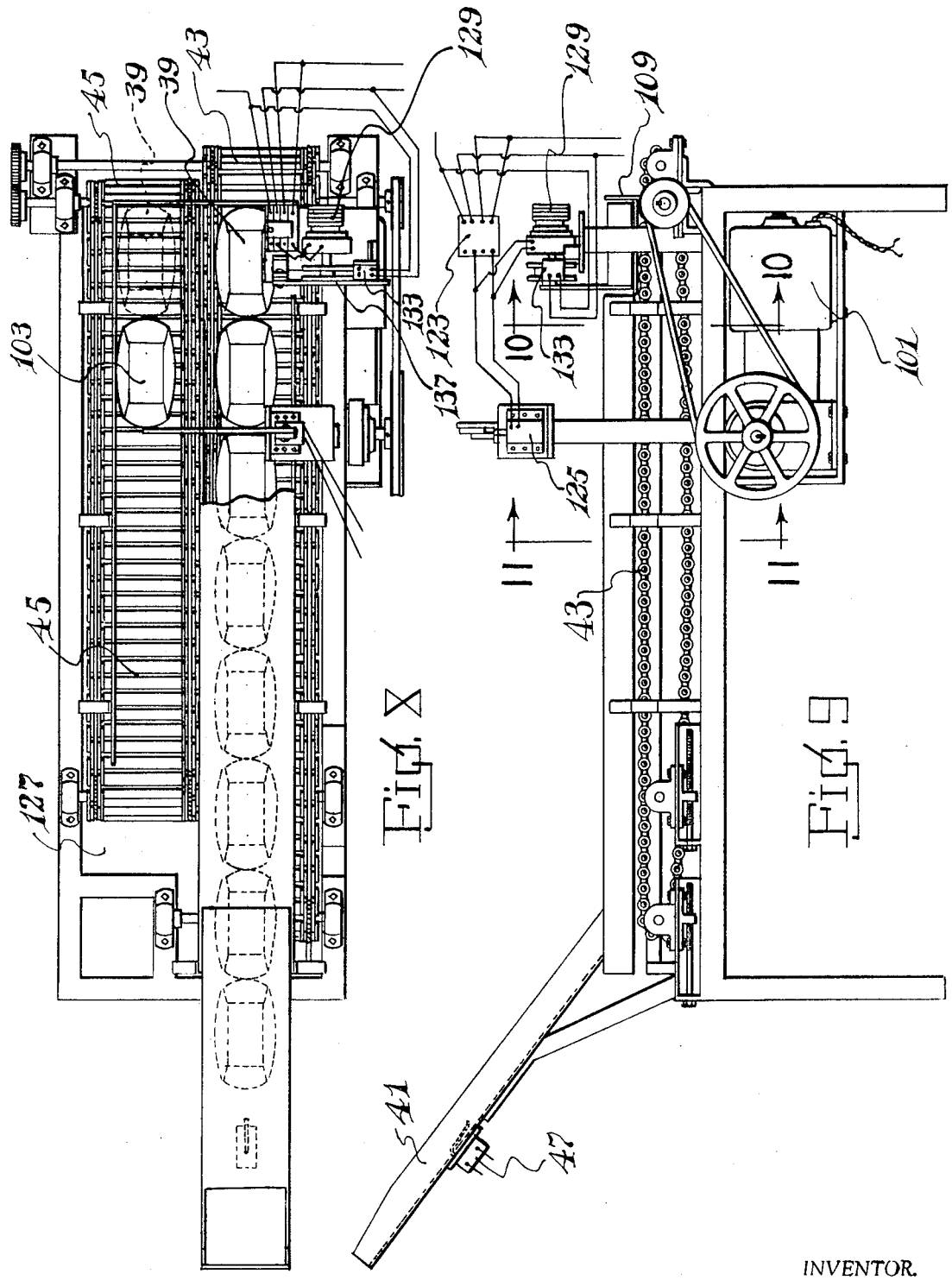

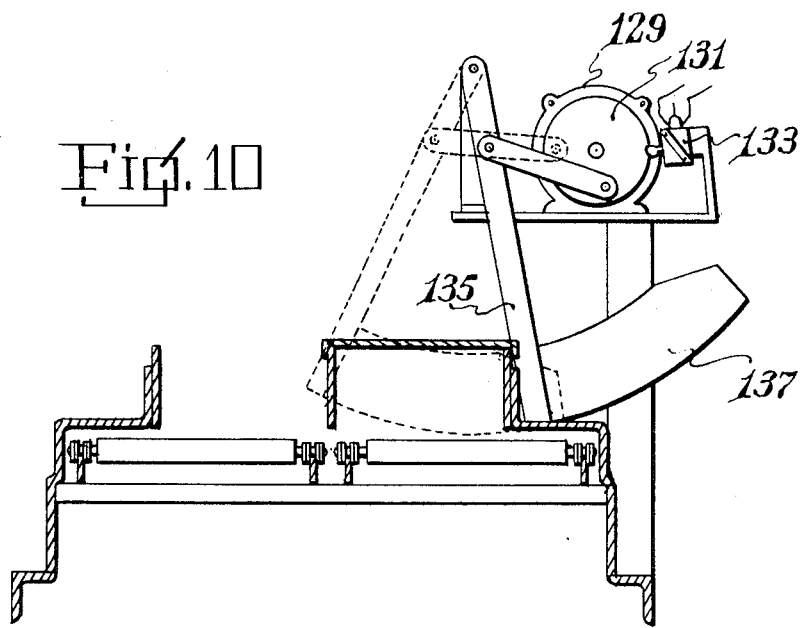
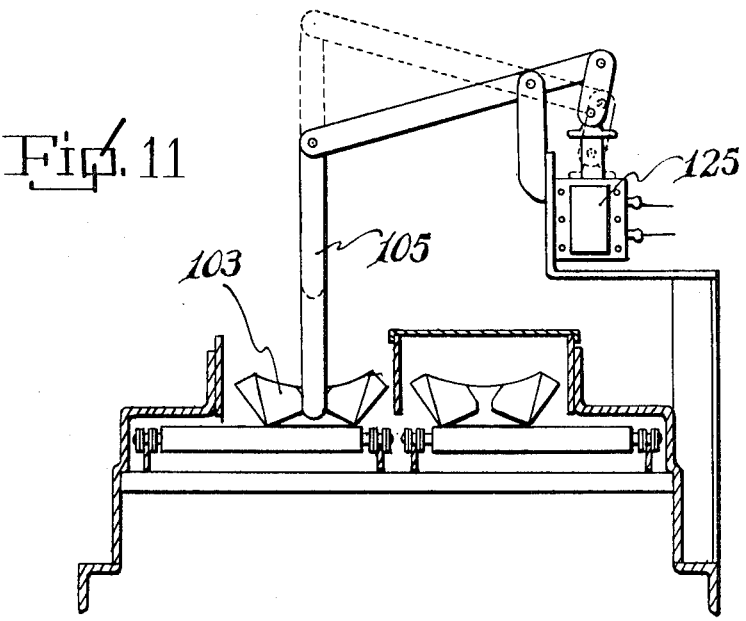

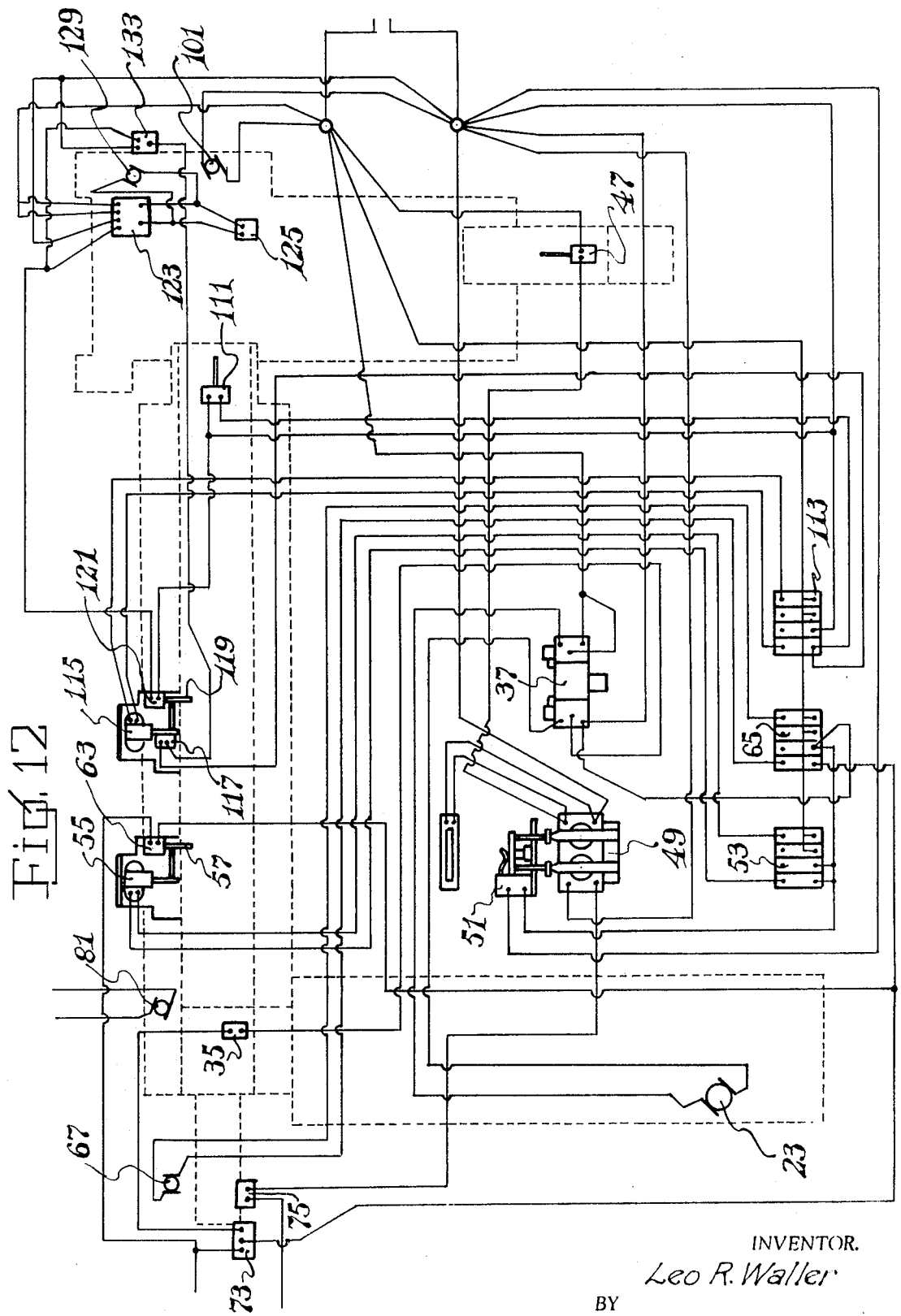

AUTOMATIC FOOD FRYER

The present invention relates to automatic food fryers, more particularly of the type in which the operations of feeding, frying and packaging the food are automatically controlled.

It is an object of the present invention to provide an automatic food fryer whose operations from feeding of the raw food to packaging of the fried food are automatically effected and controlled in such a way as to prevent malfunction, thereby to provide an integrated food-feeding and frying and packaging apparatus whose operation requires a minimum of supervision.

It is also an object of the present invention to provide an automatic food fryer which will be relatively simple and inexpensive to manufacture, easy to install, operate, maintain and repair, and rugged and durable in use.

Other objects and advantages of the present invention will become apparent from a consideration of the following description, taken in connection with the accompanying drawings, in which:

FIG. 1 is an elevational view of food-feeding apparatus comprising a portion of the present invention;

FIG. 2 is a view of the structure shown in FIG. 1, but in section;

FIG. 3 is a side elevation in section of the food-frying portion of the apparatus;

FIG. 4 is a view of the left end of FIG. 3 but showing the food being introduced into the hot cooking oil;

FIG. 5 is an enlarged fragmentary perspective view of the food guide structure at the feed end of the cooking section;

FIG. 6 is an enlarged fragmentary perspective view of the feed end of the cooking section;

FIG. 7 is a cross-sectional view of the cooking vessel;

FIG. 8 is a top plan view of the food-packaging section of the apparatus, with parts broken away for clarity;

FIG. 9 is a side elevational view of the structure shown in FIG. 8;

FIG. 10 is a cross-sectional view taken on the line 10–10 of FIG. 9;

FIG. 11 is a cross-sectional view taken on the line 11–11 of FIG. 9; and

FIG. 12 is a simplified circuit diagram of the apparatus.

INITIAL FOOD FEED

Referring now to the drawings in greater detail, and first with reference to FIGS. 1 and 2 relating to the feed mechanism for raw food, there is shown a storage bin 1 for raw food such as raw potatoes that have been cut up for frying. An endless conveyor belt 3 forms the bottom of bin 1 for urging food toward a chute 5 through which the food falls by gravity onto a subjacent endless belt conveyor 7. The discharge of food from bin 1 is assisted by a discharge assistant in the form of a rotor 9 having a plurality of blades 11 thereon, the rotor 9 rotating counterclockwise as seen in FIG. 2 so that the blades 11 in their lowermost position travel in about the same direction as the food.

The conveyor 7 in turn discharges into a chute 13 through which the food falls onto a further conveyor 15, and thence to a chute 17 which feeds to a conveyor 19 which feeds to a final feed conveyor 21.

The conveyors 3, 7, 15, 19 and 21 and the rotor 9 are of course power driven; and to this end, an electric motor 23 is provided which drives a gear reduction unit 25 which in turn drives sprockets over which are trained sprocket chains to further sprockets, and so on as shown in FIG. 1, so that one of the end wheels over which each of the conveyors is trained, as well as the shaft of rotor 9, will be driven in rotation at an appropriate speed. Specifically, each successive conveyor travels faster than the preceding conveyors. Conventional belt-tensioning devices are also provided for adjusting the tension of the conveyors. It will also be noted that the conveyors are generally disposed one above the other and feed in alternate directions, thereby to consolidate the conveyors into a relatively compact unit.

The purpose of having plural conveyors traveling at successively greater speeds is to spread out the pieces of food relatively uniformly so that they will not tend to bunch together and be fed in clusters. For example, if the food to be fried is pieces of potato, which tend to be moist and stick together, the feeding of such pieces by means of a single conveyor might result in clusters of the food being delivered to the cooking operation. But by the present invention, in which the food is transferred from conveyor to conveyor and the conveyors operate at different speeds, the pieces of food tend to be progressively spaced apart. To this end, as will be evident from the relative sizes of the sprockets that drive the various conveyors as seen in FIG. 1, conveyor 3 is the slowest and conveyors 7, 15, 19 and 21 have a progressively greater linear velocity of their upper or conveying runs.

Final conveyor 21 is upwardly inclined and relatively long and discharges from its upper end into the cooking section of the apparatus, which is best seen in FIGS. 3—7. Specifically, the upper end of conveyor 21 overlies and discharges into a scale tray 27 which has a flat bottom and upstanding sides and which has a door 29 that swings open by gravity about an axle 31. Tray 27 is mounted for vertical swinging movement on and relative to scales 33 that may be set to tilt down at any predetermined weight of food in scale tray 27.

When the scales 33 tilt from the position of FIG. 3 to the position of FIG. 4, a switch 35 is contacted which breaks the circuit to relay 37 and discontinues the operation of motor 23. In this way, no more food is fed to tray 27 when tray 27 is in the broken-line position of FIG. 4. In fact, this condition of the apparatus, with the scales overbalanced and a measured weight of raw food in tray 27, is the condition the apparatus will assume when idle, that is, between orders.

CONTAINER FEED

With the parts in this condition, the apparatus is ready to receive and process orders. To signal the apparatus to process an order, the operator places a container 39 in a container-receiving chute 41. The container 39 slides down chute 41 and onto one of a pair of oppositely traveling power-driven conveyors 43 and 45, as best seen in FIG. 8. The upper run of the conveyor 43 travels to the right as seen in FIG. 8, while the upper run of the conveyor 45 travels to the left as seen in FIG. 8.

When passing through chute 41, container 39 trips a feeler switch 47 which actuates the "add" side of an adding and subtracting register 49. Upon thus receiving a pulse from switch 47, register 49 adds one unit corresponding to the registration of one order, and also closes a switch 51 thus energizing relay 53 which in turn energizes solenoid 55.

Solenoid 55 extends a feeler 57 into the path of the partitions 59 on an endless power-driven conveyor 61 by which the food to be fried is conveyed through the hot cooking oil. When the feeler 57 is contacted by a partition 59, a microswitch 63 is closed, which energizes a relay 65 which in turn actuates an electric motor 67.

FRYER FEED

The operation of motor 67 can best be seen from a comparison of the left end of each of FIGS. 3 and 4. Motor 67 serves to rotate a cam 69 clockwise as seen in FIGS. 3 and 4. The rest position of cam 69 is shown in FIG. 3, while a position of cam 69 during its rotation is shown in FIG. 4. In the rest or FIG. 3 position, a notch 71 on the periphery of cam 69 receives the feeler of a switch 73 in its open position.

When cam 69 begins to rotate, the feeler of switch 73 is thrown out of notch 71 and switch 73 is closed, which holds the relay 65 actuated thereby to continue the operation of motor 67 for 1 full revolution of cam 69. When the notch 71 has proceeded a distance about its path of travel, it receives the feeler of a switch 75, which momentarily closes this switch to energize the "subtract" side of register 49, thereby to return the register to zero condition, which is the condition characteristic of the fact that no orders are awaiting processing and that the only or last order is in the process of being filled or has been filled. Also during rotation of cam 69, the closed switch 73 breaks the circuit that includes switch 35 and relay 37, so that motor 23 continues to be inactive and no further food is advanced toward tray 27 at this time.

The rotation of cam 69 also actuates a linkage 77 which bears against the underside of tray 27 to tilt tray 27 vertically from the FIG. 3 position to the FIG. 4 position so that door 29 opens by gravity and the food is fed to conveyor 61 between two adjacent partitions 59 of conveyor 61. The apparatus is so timed that the contact between partition 59 and feeler 57 actuates the motor 67 at a time and at a speed such that all of the food is fed by gravity between an adjacent pair of partitions 59, and the food in a given order is thus not distributed among a plurality of compartments between partitions, but instead a single order is maintained in a single compartment. As will be seen later on, if a single order were distributed between a plurality of compartments, then this order would be mistakenly handled by the machine as though it were a plurality of orders and would be mistakenly packaged in a plurality of containers. Therefore, it is important that a single order be disposed in a single compartment between partitions 59.

Upon the completion of the rotation of cam 69, the feeler of switch 73 falls back into notch 71, whereupon motor 23 again operates to refill the tray 27 with an order of food, the tray 27 having been returned to its horizontal position by the withdrawal of the linkage 77 from the FIG. 4 position to the initial or rest position of FIG. 3.

THE FRYER

The food is now moved horizontally by the lower run of conveyor 61 through a tank or trough 79 full of hot cooking oil. Conveyor 61 is continuously driven so that its lower run moves from left to right, as seen in FIG. 3, by an electric motor 81 whose controls are not shown because they are not interrelated to the controls that form part of the novelty of the present invention. When passing through trough 79, the food moves along a false bottom in the form of a horizontal screen 83, which has sidewalls and a downwardly inclined chute 85 at its end that receives the food and an upwardly inclined discharge chute 87 at its end from which the food is discharged from trough 79, that is, at the right end of FIG. 3. During its passage along screen 83 and chutes 85 and 87, the food is thoroughly fried by immersion in hot oil.

The oil is maintained hot by a burner 89 best seen in FIGS. 3 and 7, comprising a blower 91 for feeding air and a gas inlet 93 for feeding a combustible gas to the burner. The gas-and-air mixture is burned in a plurality of ducts 95 that pass horizontally through the cooking oil to heat the same and which discharge into a plenum chamber 97 whence the exhaust gases are removed through a flue 99.

FOOD PACKAGING

The packaging portion of the apparatus will now be described, with particular reference to FIGS. 8—11. To begin with, it should be noted that the rest position of the parts, between orders, is characterized in that the conveyors 43 and 45 are continuously circulating but in opposite directions under the drive of a continuously operating motor 101. In this rest position of the parts, there is a container 103 on conveyor 45, which is held stationary on conveyor 45 by a detaining means in the form of a stop bar 105 while the upper run of conveyor 45 moves under this detained container 103. It is into this detained or leading container 103 on the conveyor 45 that the fried food is discharged from a superposed downwardly inclined chute 107. The container which triggered the filling of the order in question actually does not receive the order it triggered, but instead is held against a retaining means in the form of a fixed stop bar 109 while the upper run of conveyor 43 circulates under this retained container.

The movement of the order of food down the chute 107 trips a feeler switch 111 which initiates a chain of events. When switch 111 is thus closed, relay 113 is energized, which in turn energizes a solenoid 115 along the path of conveyor 61 and a microswitch 117 which holds the solenoid 115 in energized condition so as to prevent intermittent energizing and deenergizing or stuttering of solenoid 115 as the uneven pieces of food pass beneath the feeler of switch 111. Solenoid 115 extends a feeler 119 into the path of the partitions 59 of conveyor 61; and upon the next partition 59 of the continuously circulating conveyor 61 striking the feeler 119, a microswitch 121 is closed, which energizes a relay 123. In this way, the movement of conveyor 61 and the position of the compartments between the partitions 59 thereon is coordinated with the action of the rest of the conveyor and the sequence of events is properly timed so that the food will be fed into the detained container 103 before the release of that container.

Energization of relay 123 causes the withdrawal of the stop bar 105. To this end, a solenoid 125 is provided which is energized by relay 123 to raise stop bar 105 from the full-line position to the phantom-line position of FIG. 11. Thus, at this suitable instant the filled container 103 is released and moves with conveyor 45 to the left as seen in FIG. 8, to a discharge station 127 whence it is removed from the apparatus and served to the customer.

Relay 123 also energizes a motor 129 whose purpose is to rotate a cam 131 counterclockwise as best seen in FIG. 10. Cam 131 has a notch in its periphery in which the feeler of a microswitch 133 is disposed in the rest position of the parts in which motor 129 is deactivated. Upon rotation of cam 131, microswitch 133 is actuated to open the circuit to deenergize relay 113 and solenoid 115 and to close a circuit to continue energization of relay 123 and hence to energize solenoid 125 and motor 129 for a period of time sufficient to permit the passage of filled container 103 beneath the raised stop bar 105.

Cam 131 also actuates a pusher 135 as seen in FIG. 10. Toward the end of its rotation, shortly before the feeler of microswitch 133 drops back into the notch in the periphery of cam 131, pusher 135 moves across above conveyor 43 and pushes the container 39 from the full-line position shown at the right of FIG. 8 to the phantom-line position shown at the right of conveyor 45 in FIG. 8, that is, pusher 135 moves from the full-line to the phantom-line position of FIG. 10. The filled container 103 has already moved to the left in FIG. 8 and stop bar 105 is about to fall. The container 39 is thus carried a short distance on conveyor 45 to the left as seen in FIG. 8, from the phantom-line position to what was immediately previously the full-line position of container 103 in FIG. 8, but not before stop bar 105 has fallen in order to arrest further movement of the container 39, whereupon the container 39 becomes the detained container but remains in position beneath chute 107 until another order is triggered by the insertion of a further container in chute 41. Pusher 135 has a shield 137 thereon so that further containers cannot interfere with the movement of pusher 135 if introduced while pusher 135 is in the phantom-line position of FIG. 10.

It will be recognized that the foregoing description is given in simplest terms, as though there were only one order placed. Actually, orders can be placed as fast as containers can be fed to chute 41, the backlog of orders being preserved and accounted for by addition as they are placed, on register 49, and by subtraction as they are filled.

It will also be appreciated that the placing of an empty container in chute 41 and the removal of a filled container from discharge station 127 are the only actions which the operator need perform in connection with the filling of an individual order.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A food fryer comprising a tank for hot cooking oil, conveyor means for delivering a predetermined quantity of food to the tank for frying the food in the oil, conveyor means for moving the food through and out of the tank, packaging means for placing said predetermined quantity of fried food from the tank in a portable container for the food, said conveyor means for moving the food through and out of the tank including an endless power-driven conveyor having a plurality of partitions thereon that define between them compartments for the food, said delivering conveyor means including a vertically swinging member for delivering said predetermined quantity of food into a single said compartment, and means responsive to a predetermined position of one or said partitions for swinging said vertically swinging member thereby to deliver the whole of said 2. A food fryer comprising a tank for hot cooking oil, conveyor means for delivering a predetermined quantity of food to the tank for frying the food in the oil, conveyor means for moving the food through and out of the tank, packaging means for placing said predetermined quantity of fried food from the tank in a portable container for the food, means responsive to the introduction of a portable container into said packaging means for actuating said delivering conveyor means, and register means for counting the number of containers introduced into said packaging means and for discontinuing the operation of said delivering conveyor means when said delivering conveyor means has delivered to the tank a number of said predetermined quantities of food equal to the number of said introduced containers.